(12) United States Patent
Oishi

(10) Patent No.: US 10,171,211 B2
(45) Date of Patent: Jan. 1, 2019

(54) WIRELESS COMMUNICATION SYSTEM AND METHOD, AND WIRELESS COMMUNICATION APPARATUS

(71) Applicant: PIONEER CORPORATION, Kanagawa (JP)

(72) Inventor: Hirokazu Oishi, Kawasaki (JP)

(73) Assignee: PIONEER CORPORATION, Kanagawa (JP)

( * ) Notice: Subject to any disclaimer, the term of this patent is extended or adjusted under 35 U.S.C. 154(b) by 0 days.

(21) Appl. No.: 14/892,584

(22) PCT Filed: Jun. 4, 2013

(86) PCT No.: PCT/JP2013/065497
§ 371 (c)(1),
(2) Date: Nov. 20, 2015

(87) PCT Pub. No.: WO2014/196023
PCT Pub. Date: Dec. 11, 2014

(65) Prior Publication Data
US 2016/0119098 A1  Apr. 28, 2016

(51) Int. Cl.
*H04L 5/00* (2006.01)
*H04W 74/08* (2009.01)
(Continued)

(52) U.S. Cl.
CPC ............ *H04L 5/0048* (2013.01); *H04W 4/00* (2013.01); *H04W 74/0808* (2013.01);
(Continued)

(58) Field of Classification Search
None
See application file for complete search history.

(56) References Cited

U.S. PATENT DOCUMENTS

2006/0221926 A1* 10/2006 Maekawa ............ H04W 92/02
370/345
2008/0002636 A1  1/2008 Gaur et al.
(Continued)

FOREIGN PATENT DOCUMENTS

JP  2004-242204  8/2004
JP  2005-012275  1/2005
(Continued)

OTHER PUBLICATIONS

International Search Report PCT/JP2013/065497 dated Aug. 27, 2013.

*Primary Examiner* — Charles C Jiang
*Assistant Examiner* — George Atkins, Jr.
(74) *Attorney, Agent, or Firm* — Young & Thompson

(57) ABSTRACT

A wireless communication system is a wireless communication system that adopts backoff control. The wireless communication system is provided with: a first wireless communication apparatus; and a second wireless communication apparatus. The first wireless communication apparatus transmits a first signal to the second wireless communication apparatus with a first period, and the second wireless communication apparatus transmits a second signal to the first wireless communication apparatus with a delay of a fixed time, which is shorter than one period of the first period, from a time point at which the first wireless communication apparatus transmits the first signal.

14 Claims, 5 Drawing Sheets

(51) Int. Cl.
*H04W 4/00* (2018.01)
*H04W 76/00* (2018.01)
*H04W 72/12* (2009.01)
*H04W 48/12* (2009.01)

(52) U.S. Cl.
CPC ....... *H04W 74/0816* (2013.01); *H04W 76/00* (2013.01); *H04L 5/0051* (2013.01); *H04L 5/0055* (2013.01); *H04W 48/12* (2013.01); *H04W 72/12* (2013.01)

(56) References Cited

U.S. PATENT DOCUMENTS

2012/0057622 A1     3/2012   Kimura et al.
2015/0327262 A1*   11/2015   Kwon ............... H04W 72/1289
                                                                                        370/329

FOREIGN PATENT DOCUMENTS

| JP | 2006-295869 | | 10/2006 | |
|----|-------------|---|---------|---|
| JP | 2007-129772 | | 5/2007 | |
| JP | 2007-266950 | | 10/2007 | |
| JP | 2008-011509 | | 1/2008 | |
| JP | 2008-167149 | | 7/2008 | |
| JP | 2008-206024 | | 9/2008 | |
| JP | 2012-147324 | | 8/2012 | |
| KR | 10-2013-0049514 | * | 5/2013 | ........ H04W 72/0446 |
| WO | 2010128620 | | 11/2010 | |

* cited by examiner

WIRELESS COMMUNICATION SYSTEM AND METHOD, AND WIRELESS COMMUNICATION APPARATUS

TECHNICAL FIELD

The present invention relates to a wireless communication system, a wireless communication method, and a wireless communication apparatus.

BACKGROUND ART

In this type of system, it is tried to suppress the collision of wireless communication. For example, in Patent Literature 1, the following technology is proposed. If there is a wireless network including a plurality of wireless stations that use the same channel, then, signals transmitted from wireless stations that belong to another wireless network are detected, and a collision avoidance time is determined on the basis of the detected signals. This reduces a collision probability of the signals transmitted from the wireless stations.

Alternatively, in Patent Literature 2, the following technology is proposed. If there are two or more data packets in a transmission buffer, then, a random number value used for backoff control upon transmission of a second data packet is generated upon transmission of a first data packet, and the random number value is written in the first data packet. An ACK packet for the first data packet is received from a wires base station, and a random number value written in the ACK packet is read and used for the backoff upon transmission of the second data packet. This reduces a collision probability of the data packets transmitted from wireless terminals.

Alternatively in Patent Literature 3, the following technology is proposed. If the avoidance of the collision of wireless packets is realized by a method such as carrier sense multiple access/collision avoidance (CSMA/CA), a use status of a common channel is collected, and it is determined whether or not there is much free time on the common channel after passing a predetermined time. A maximum value of the collision avoidance time is changed or held. This improves a transmission efficiency of a communication system.

Alternatively in Patent Literature 4, the following technology is proposed. When a wireless base station apparatus or a wireless terminal apparatus transmits data packets, the apparatus firstly transmits a packet having no data upon acquisition of a transmission right after performing carrier sense for a fixed period or for a random period, and after completion of the transmission of the packet, the apparatus continuously transmits data packets at short intervals without performing the carrier sense.

CITATION LIST

Patent Literature

Patent Literature 1: Japanese Patent Application Laid Open No. 2007-266950
Patent Literature 2: Japanese Patent Application Laid Open No. 2004-242204
Patent Literature 3: Japanese Patent Application Laid Open No. 2005-12275
Patent Literature 4: Japanese Patent Application Laid Open No. 2008-206024

SUMMARY OF INVENTION

Technical Problem

By the way, during power transmission, information associated with charge, such as, for example, required voltage, required current, and battery remaining capacity, is transmitted and received between a charging apparatus configured to perform wireless power transmission and an object to be charged by the charging apparatus, in many cases. On the charging apparatus configured to perform the wireless power transmission, the information associated with the charge is transmitted and received by the wireless communication in many cases. Here, in particular, real time property of the information is emphasized during the power transmission, and it is thus desired to transmit and receive the information associated with the charge with a fixed period.

However, for example, if the technologies described in the Patent Literatures 1 to 4 are applied to the transmission and reception of the information associated with the charge, there is a possibility that transmission timing is shifted (i.e. there is a possibility that it becomes hard to transmit and receive the information with a fixed period) due to collision avoidance control of the wireless communication, which is technically problematic.

In view of the aforementioned problems, it is therefore an object of the present invention to provide a wireless communication system, a wireless communication method, and a wireless communication apparatus that are suitable for regular communication while avoiding the communication collision.

Solution to Problem

The above object of the present invention can be achieved by a wireless communication system that adopts backoff control, said wireless communication system is provided with: a first wireless communication apparatus; and a second wireless communication apparatus, wherein the first wireless communication apparatus transmits a first signal to the second wireless communication apparatus with a first period, the second wireless communication apparatus transmits a second signal to the first wireless communication apparatus with a delay of a fixed time, which is shorter than one period of the first period, from a time point at which the first wireless communication apparatus transmits the first signal.

The above object of the present invention can be achieved by a wireless communication method in a wireless communication system that adopts backoff control, said wireless communication system is provided with: a first wireless communication apparatus; and a second wireless communication apparatus, said wireless communication method is provided with: a first transmission process in which the first wireless communication apparatus transmits a first signal to the second wireless communication apparatus with a first period, and a second transmission process in which the second wireless communication apparatus transmits a second signal to the first wireless communication apparatus with a delay of a fixed time, which is shorter than one period of the first period, from a time point at which the first wireless communication apparatus transmits the first signal.

The above object of the present invention can be achieved by a wireless communication apparatus, which is one of two wireless communication apparatuses in a wireless communication system that adopts backoff control, the wireless communication apparatus is provided with: a communicating device configured to perform wireless communication; a reference signal sending device configured to send a reference signal; and an offset time determining device configured to determine an offset time associated with each of the two wireless communication apparatuses with respect to the reference signal, wherein said communicating device transmits a signal indicating the determined offset time to the other wireless communication apparatus out of the two wireless communication apparatuses, and starts to transmit a signal with a predetermined period to the other wireless communication apparatus, after passing only for the offset time associated with the one wireless communication apparatuses from sending the reference signal.

The above object of the present invention can be achieved by a wireless communication apparatus, which is one of two wireless communication apparatuses in a wireless communication system that adopts backoff control, the wireless communication apparatus is provided with: a communicating device configured to perform wireless communication, wherein said communicating device receives a signal indicating an offset time determined by the other wireless communication apparatus out of the two wireless communication apparatuses, and starts to transmit a signal with a predetermined period to the other wireless communication apparatus, after passing only for an offset time indicated by the received signal from sending a reference signal from the other transmission communication apparatus.

The operation and other advantages of the present invention will become more apparent from embodiments and examples explained below.

DESCRIPTION OF EMBODIMENTS

Figure 1:
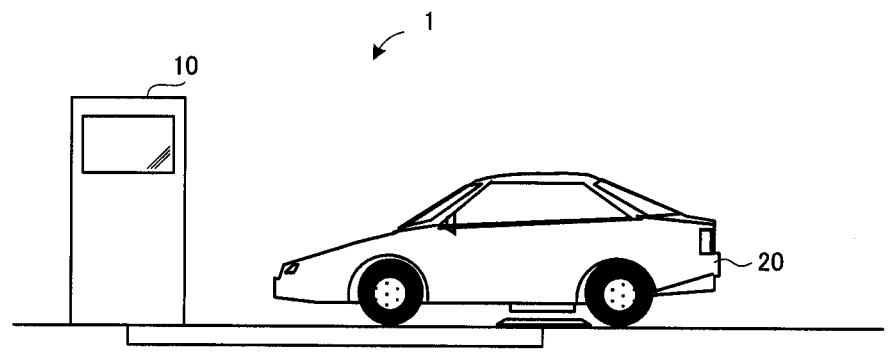
FIG. 1 is a conceptual diagram illustrating an outline of a wireless communication system according to a first example.

A wireless communication system, a wireless communication method, and a wireless communication apparatus according to embodiments of the present invention will be explained.

(Wireless Communication System)

A wireless communication system according to an embodiment is a wireless communication system that adopts backoff control. The wireless communication system is provided with: a first wireless communication apparatus; and a second wireless communication apparatus. The first wireless communication apparatus and the second wireless communication apparatus are configured to perform wireless communication in accordance with, for example, IEEE 802.11 or the like.

The first wireless communication apparatus transmits a first signal to the second wireless communication apparatus with a first period. The second wireless communication apparatus transmits a second signal to the first wireless communication apparatus with a delay of a fixed time, which is shorter than one period of the first period, from a time point at which the first wireless communication apparatus transmits the first signal.

Here, the "fixed time" is determined, for example, as a time in which the collision of the wireless communication does not occur before the wireless communication is performed between the first wireless communication apparatus and the second wireless communication apparatus.

In the wireless communication system, as described above, after the first signal is transmitted from the first wireless communication apparatus, the second signal is transmitted from the second wireless communication apparatus with a delay of the fixed time. It is thus possible to preferably avoid the collision of the first signal and the second signal.

In the wireless communication system that adopts the backoff control, a backoff time is determined by integration of a random number value and a throttle time. In the embodiment, however, the second wireless communication apparatus is configured to transmit the second signal with a delay of the fixed time from the transmission of the first signal. Thus, it is possible to avoid a shift of transmission timing caused by the random number value in the backoff control.

Therefore, according to the wireless communication system, it is possible to realize regular communication while avoiding the communication collision.

In one aspect of the wireless communication system according to the embodiment, the first wireless communication apparatus further sends a first reference signal with a second period, which is longer than the first period. The "first reference signal" may include, for example, identification information associated with the first wireless communication apparatus or the like.

The first wireless communication apparatus transmits the first signal to the second wireless communication apparatus with the first period, from a time point at which only for a first offset time passes from a time point at which the first reference signal is sent, in one period associated with the second period. The first wireless communication apparatus transmits a third signal indicating a second offset time, which is a time obtained by adding the first offset time and the fixed time, to the second wireless communication apparatus.

The second wireless communication apparatus transmits the second signal to the first wireless communication apparatus with the first period, from a time point at which only for the second offset time passes from the time point at which the first reference signal is sent, in one period associated with the second period.

By virtue of such a configuration, for example, an error in transmission timing of the first signal and the second signal can be corrected every time the first reference signal is sent, which is extremely useful in practice.

In another aspect of the wireless communication system according to the embodiment, said wireless communication system uses a CSMA/CA method.

In this aspect, the first offset time can be greater than a value that is obtained by adding a doubled value of DIFS, a maximum value of a contention window, and an occupancy time associated with the transmission of the first signal. By virtue of such a configuration, in the case of "no MAC ACK", the communication collision can be certainly avoided, which is extremely useful in practice.

Alternatively, in this aspect, the first offset time can be greater than a value that is obtained by adding a doubled value of DIFS, a maximum value of a contention window, an occupancy time associated with the transmission of the first signal, a SIFS, and an occupancy time associated with an ACK frame. By virtue of such a configuration, in the case of "MAC ACK", the communication collision can be certainly avoided, which is extremely useful in practice.

In another aspect of the wireless communication system according to the embodiment, the first wireless communication apparatus transmits a signal indicating a third offset time, to another wireless communication system, which is different from said wireless communication system, so that a second reference signal associated with the another wireless communication system is transmitted at a time point at which only for the third offset time passes from the time point at which the first reference signal is sent.

By virtue of such a configuration, it is possible to suppress interference between the wireless communication system and another wireless communication system, which is extremely useful in practice.

(Wireless Communication Method)

A wireless communication method according to an embodiment is a wireless communication method in a wireless communication system that adopts backoff control, said wireless communication system is provided with: a first wireless communication apparatus; and a second wireless communication apparatus, said wireless communication method is provided with: a first transmission process in which the first wireless communication apparatus transmits a first signal to the second wireless communication apparatus with a first period, and a second transmission process in which the second wireless communication apparatus transmits a second signal to the first wireless communication apparatus with a delay of a fixed time, which is shorter than one period of the first period, from a time point at which the first wireless communication apparatus transmits the first signal.

According to the wireless communication method, as in the wireless communication system according to the aforementioned embodiment, it is possible to realize the regular communication while avoiding the communication collision. Even in the wireless communication method, it is possible to adopt the same various aspects as those of the wireless communication system according to the aforementioned embodiment.

(Wireless Communication Apparatus)

A first wireless communication apparatus according to an embodiment, a wireless communication apparatus, which is one of two wireless communication apparatuses in a wireless communication system that adopts backoff control, the wireless communication apparatus is provided with: a communicating device configured to perform wireless communication; a reference signal sending device configured to send a reference signal; and an offset time determining device configured to determine an offset time associated with each of the two wireless communication apparatuses with respect to the reference signal.

The communicating device transmits a signal indicating the determined offset time to the other wireless communication apparatus out of the two wireless communication apparatuses, and starts to transmit a signal with a predetermined period to the other wireless communication apparatus, after passing only for the offset time associated with the one wireless communication apparatus from sending the reference signal.

According to the first wireless communication apparatus, as in the wireless communication system according to the aforementioned embodiment, it is possible to realize the regular communication while avoiding the communication collision.

A second wireless communication apparatus according to an embodiment, a wireless communication apparatus, which is one of two wireless communication apparatuses in a wireless communication system that adopts backoff control, the wireless communication apparatus is provided with: a communicating device configured to perform wireless communication.

The communicating device receives a signal indicating an offset time determined by the other wireless communication apparatus out of the two wireless communication apparatuses, and starts to transmit a signal with a predetermined period to the other wireless communication apparatus, after passing only for an offset time indicated by the received signal from sending a reference signal from the other transmission communication apparatus.

According to the second wireless communication apparatus, as in the wireless communication system according to the aforementioned embodiment, it is possible to realize the regular communication while avoiding the communication collision.

EXAMPLES

A wireless communication system according to examples of the present invention will be explained with reference to the drawings.

First Example

Figure 2:
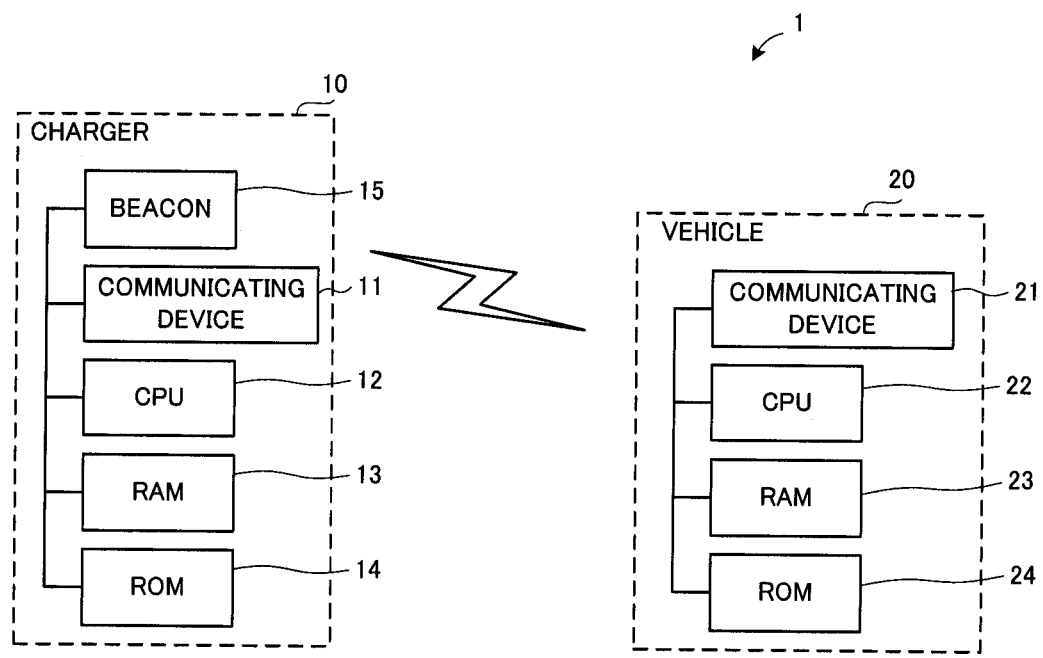
FIG. 2 is a block diagram illustrating a main part of the wireless communication system according to the first example.

A wireless communication system according to a first example of the present invention will be explained with reference to FIG. 1 to FIG. 4. FIG. 1 is a conceptual diagram illustrating an outline of the wireless communication system according to the first example. FIG. 2 is a block diagram illustrating a main part of the wireless communication system according to the first example.

In FIG. 1, a wireless communication system 1 is provided with a charger 10 configured to perform wireless power transmission, and a vehicle 20 such as, for example, an electric vehicle. The charger 10 has a power transmission unit laid underground, while the vehicle 20 has a power reception unit on a bottom thereof. The charger 10 and the vehicle 20 perform power transmission in a wireless manner via the power transmission unit and the power reception unit. Since various known aspects can be applied to the wireless power transmission, an explanation of the details will be omitted.

In FIG. 2, the charger 10 is provided with a communicating device 11, a central processing unit (CPU) 12, a random access memory (RAM) 13, a read only memory (ROM) 14, and a beacon 15. The charger 10 is also provided, for example, with a transmission circuit or the like, other than the components illustrated in FIG. 2; however, illustration is omitted due to less relevance to the present invention.

The vehicle 20 is provided with a communicating device 21, a CPU 22, a RAM 23, and a ROM 24. Even in the vehicle 20, illustration is omitted regarding components that are less relevant to the present invention is omitted.

In the wireless communication system 1, during the wireless power transmission, information indicating a state of an apparatus is transmitted and received between the charger 10 and the vehicle 20 by wireless communication, in order to quickly detect failures and abnormality. The first example exemplifies wireless communication in which collision avoidance is performed by the CSMA/CA method in accordance with IEEE 802.11 standard. By adopting the existing wireless communication method as described above, it is possible to suppress introduction cost of the wireless communication system 1 or the like, which is extremely useful in practice.

In order to quickly detect failures and abnormality in the wireless communication system 1, signals are desirably transmitted and received with a fixed period between the charger 10 and the vehicle 20. In order to transmit and receive the signals with a fixed period by the wireless communication, the collision of the communication needs to be avoided. Here, a method of avoiding the communication collision, for example, a method of synchronizing the charger 10 and the vehicle 20 is considered. However, how to synchronize the charger 10 and the vehicle 20 is not specifically standardized. If a special standard is set, versatility is possibly lost.

Moreover, if an apparatus in communication is detected in the CSMA/CA method, there is a communication waiting time, which is obtained by integrating a random number in a range of contention window (CW) and a predetermined throttle time. Then, the waiting time becomes a jitter of the communication. If a layer associated with the wireless communication includes the jitter even though an upper layer (e.g. an application layer, etc.) of the wireless communication system 1 operates with a fixed period, real time property of the information indicating the state of the apparatus is possibly damaged.

In the first example, firstly, when the charger 10 and the vehicle 20 start the communication, a signal indicating a transmission period of a pilot signal is transmitted from the communicating device 21 of the vehicle 20 to the charger 10. The charger 10 that receives the signal adjusts a transmission period, if necessary, to be the transmission period indicated by the received signal. The transmission period is stored, for example, in the RAM 13 or the like of the charger 10.

Then, the CPU 12 of the charger 10 sets an offset time based on a beacon sent from the beacon 15 of the charger 10, for each of the charger 10 and the vehicle 20. Here, the offset time associated with the charger 10 and the offset time associated with the vehicle 20 are different from each other.

After passing the set offset time from sending the beacon, the charger 10 and the vehicle 20 transmit respective signals, and then transmit signals to each other with the aforementioned transmission period. By this, regular signal transmission and reception is realized while avoiding the communication collision.

Here, the offset time is set so as not to cause a collision avoidance operation by the CSMA/CA method. Specifically, for example, in the case of "no MAC ACK", the offset time is set as a time longer than "2×(DIFS)+CWmax+(Frame occupancy time)". On the other hand, in the case of "MAC ACK", the offset time is set as a time longer than "2× (DIFS)+CWmax+(Frame occupancy time)+SIFS+(ACK Frame occupancy time)". The offset time is based on a backoff time in the CSMA/CA method. The backoff time is normally about several hundred microseconds in the case of a high priority signal, and about 1 millisecond at most.

Figure 3:
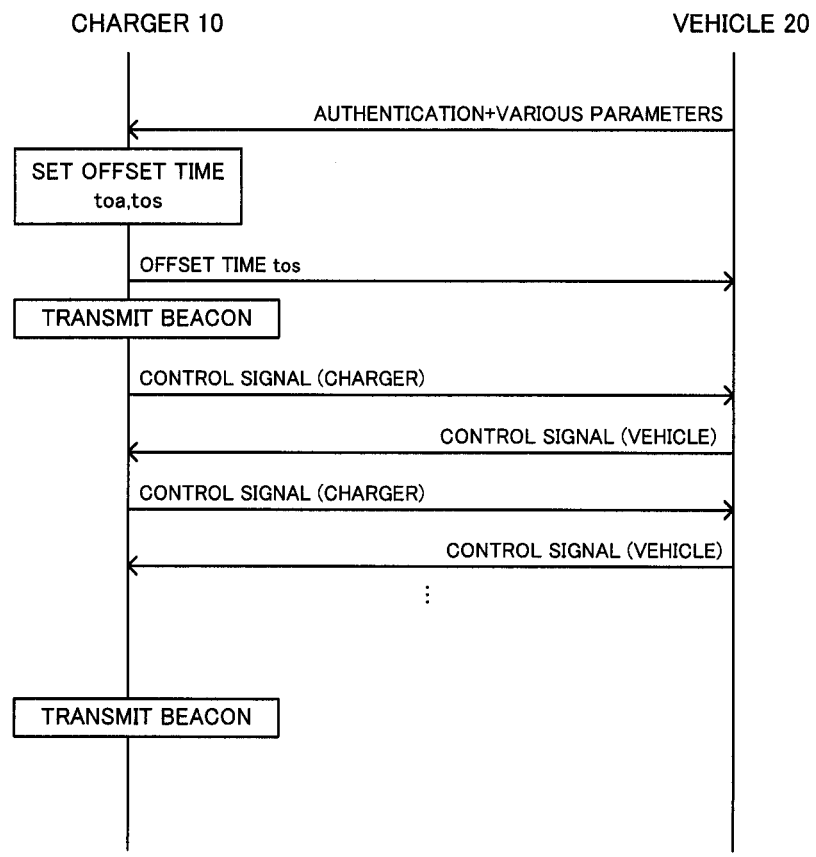
FIG. 3 is a timing chart illustrating operation of the wireless communication system according to the first example.
Figure 4:
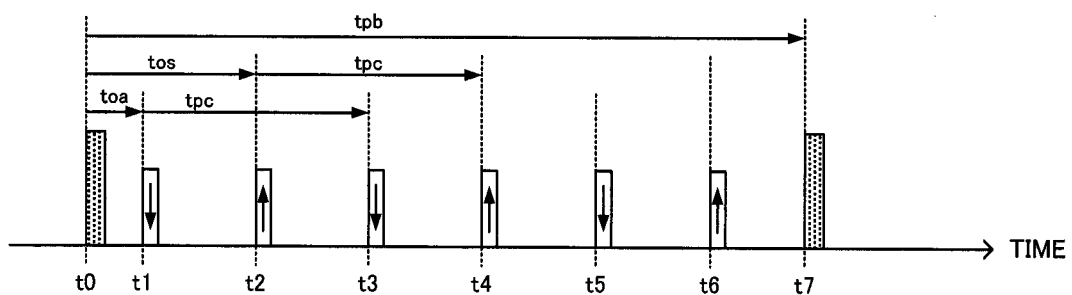
FIG. 4 is a conceptual diagram illustrating transmission timing of signals according to the first example.

Next, operation of the wireless communication system 1 as configured above will be explained with reference to FIG. 3 and FIG. 4. FIG. 3 and FIG. 4 illustrate the operation in the case of "no MAC ACK".

In FIG. 3, firstly, in order to perform the power transmission between the charger 10 and the vehicle 20, the communicating device 21 of the vehicle 20 transmits a signal indicating information associated with authentication and various parameters, to the charger 10. At this time, the communicating device 21 of the vehicle 20 also transmits the signal indicating the transmission period of the pilot signal, to the charger 10.

After the end of a predetermined authentication process, the CPU 12 of the charger 10 sets an offset time toa associated with the charger 10 and an offset time tos associated with the vehicle 20. The communicating device 11 of the charger 10 transmits a signal indicating the set offset time tos, to the vehicle 20.

Then, at a time point (refer to a time point t1 in FIG. 4) after passing only for the offset time toa from a time point at which a beacon is sent from the beacon 15 of the charger 10 (refer to a time point t0 in FIG. 4), the communicating device 11 of the charger 10 transmits a control signal to the vehicle 20. The communicating device 21 of the vehicle 20 transmits a control signal to the charger 10 at a time point (refer to a time point t2 in FIG. 4) after passing only for the offset time tos from the time point at which the beacon is sent from the charger 10.

Then, the communicating device 11 of the charger 10 transmits a control signal to the vehicle 20 at a time point (refer to a time point t3 in FIG. 4) at which only for a transmission period tpc passes from the time point t1 (refer to FIG. 4). On the other hand, the communicating device 21 of the vehicle 20 transmits a control signal to the charger 10 at a time point (refer to a time point t4 in FIG. 4) at which only for the transmission period tpc passes from the time point t2 (refer to FIG. 4). After that, the communicating device 11 of the charger 10 and the communicating device 21 of the vehicle 20 alternately transmit control signals until the beacon is sent again.

A difference between the time point t0 and a time point t7 in FIG. 4 corresponds to a sending period tpb of the beacon. The sending period tpb of the beacon is, for example, 100 milliseconds.

Now, the offset time will be explained.

The offset time toa desirably satisfies a relational expression of 2×(DIFC)+CWmax+(Frame Occupancy Time) <toa<tpc. The offset time tos desirably satisfies a relational expression of 2×(DIFC)+CWmax+(Frame Occupancy Time)<tos<tpc.

A difference between the offset time toa and the offset time tos desirably satisfies a relational expression of 2×(DIFC)+CWmax+(Frame Occupancy Time)<|tos−toa|<tpc/2. In other words, as illustrated in FIG. 4, if the offset time toa is shorter than the offset time tos, the offset time tos is longer than the offset time toa at most by "tpc/2". On the other hand, if the offset time tos is shorter than the offset time toa, the offset time toa is longer than the offset time tos at most by "tpc/2".

The "charger 10" and the "vehicle 20" according to the first example are respectively one example of the "first wireless communication apparatus" and the "second wireless communication apparatus" according to the present invention. The "CPU 12" and the "beacon 15" according to the first example are respectively one example of the "offset time setting device" and the "reference signal sending device" according to the present invention.

The "control signal (charger)", the "control signal (vehicle)", the "signal indicating the offset time tos", and the "beacon" according to the first example are respectively one example of the "first signal", the "second signal", the "third signal", and the "first reference signal" according to the present invention. The "offset time toa", the "offset time tos", the "transmission period tpc", and the "sending period tpb" are respectively one example of the "first offset time", the "second offset time", the "first period", and the "second period" according to the present invention.

Second Example

Figure 5:
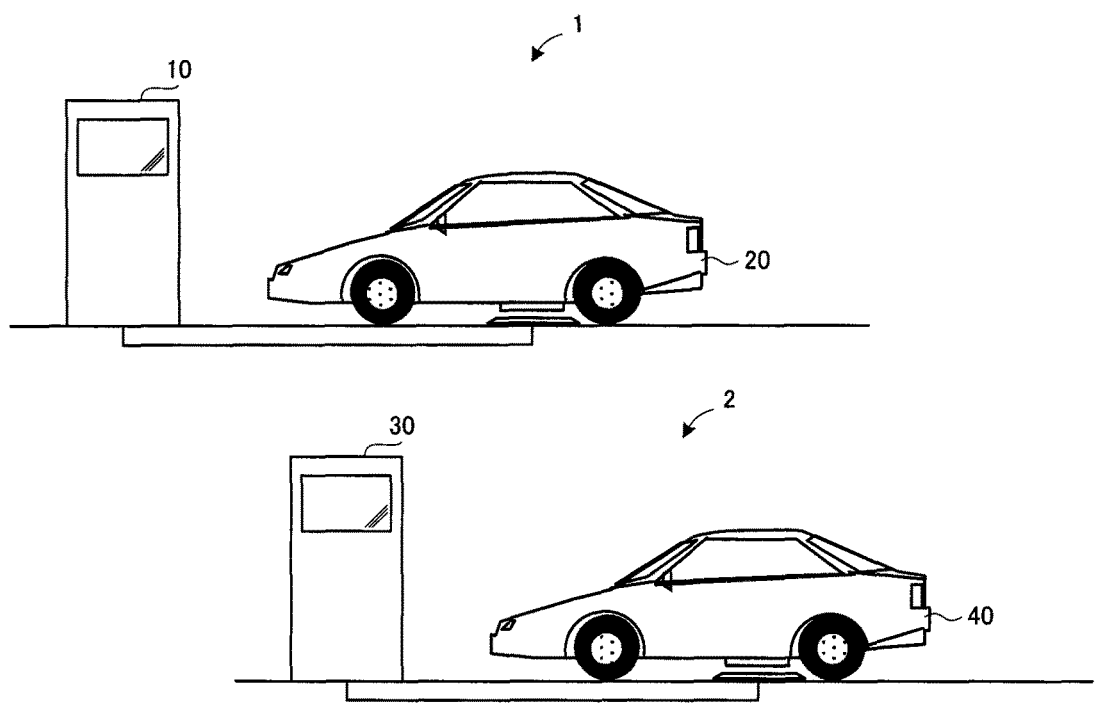
FIG. 5 is a conceptual diagram illustrating an outline of a wireless communication system according to a second example.

A wireless communication system according to a second example of the present invention will be explained with reference to FIG. 5 to FIG. 7. The wireless communication system according to the second example has the same configuration as that of the wireless communication system according to the first example, except that a communication range of the wireless communication system overlaps a communication range of another wireless communication system. Thus, an explanation of the same point as that in the first example will be omitted, and the same parts in the drawings will carry the same numerical references. Basically, a different point from the first example will be explained with reference to FIG. 5 to FIG. 7. FIG. 5 is a conceptual diagram illustrating an outline of the wireless communication system according to the second example.

In FIG. 5, the wireless communication system 1 is provided with the charger 10 and the vehicle 20. A wireless communication system 2 is provided with a charger 30 and a vehicle 40. The configurations of the charger 30 and the vehicle 40 are respectively the same as those of the charger 10 and the vehicle 20.

Figure 6:
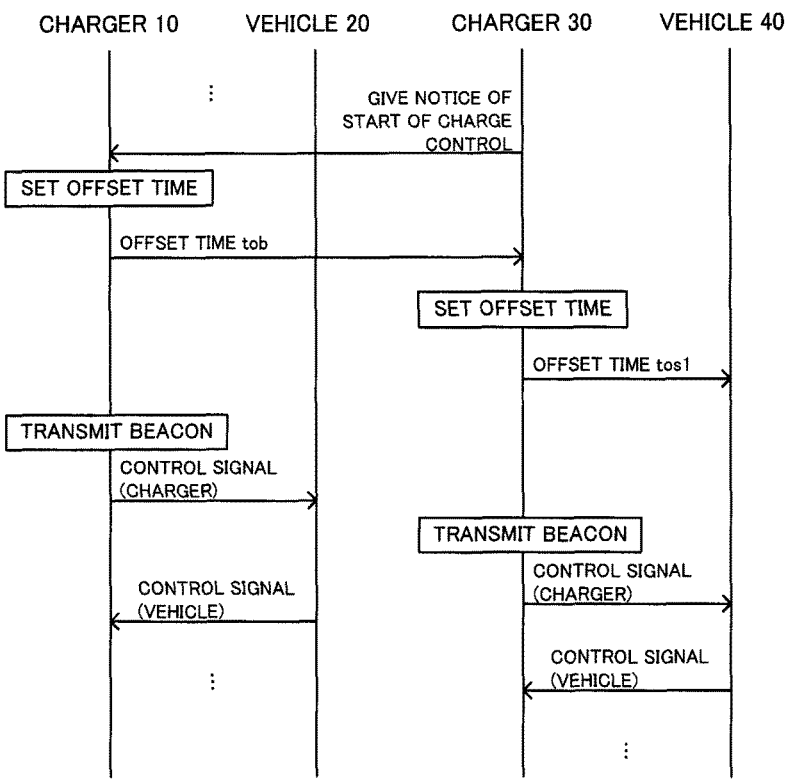
FIG. 6 is a timing chart illustrating operation of the wireless communication system according to the second example.
Figure 7:
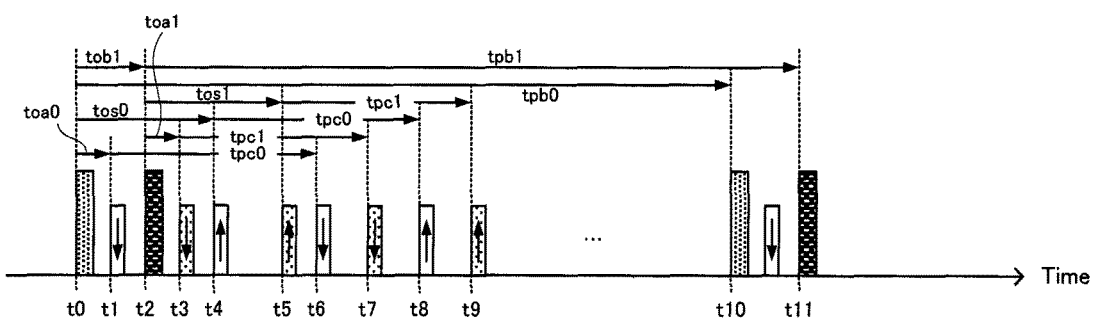
FIG. 7 is a conceptual diagram illustrating transmission timing of signals according to the second example.

With reference to FIG. 6 and FIG. 7, an explanation will be given to the operation if the power transmission is newly started between the charger 30 and the vehicle 40, which constitute the wireless communication system 2, while the power transmission is performed between the charger 10 and the vehicle 20.

If the control signal is transmitted and received between the charger 10 and the vehicle 20 in association with the power transmission in the wireless communication system 1, the charger 10 adds information indicating control communication (i.e. the transmission and reception of the control signal), to the beacon sent from the beacon 15 (refer to FIG. 2).

Thus, the wireless communication system that can receive the beacon sent from the beacon 15 of the charger 10 (or the wireless communication system 2 herein) can recognize that there is a wireless communication system that has already performed the control communication, from the received beacon.

In FIG. 6, when the power transmission is started between the charger 30 and the vehicle 40, the charger 30 transmits a signal indicating start of charge control, to the charger 10 of the wireless communication system 1. Before the transmission of the signal indicating the start of the charge control, a predetermined authentication process is performed (not illustrated) between the charger 30 and the vehicle 40.

The CPU 12 of the charger 10 that receives the signal indicating the start of the charge control (refer to FIG. 2) sets an offset time tob1 associated with a beacon sent from the charger 30, which is based on the beacon sent from the beacon 15. Then, the communicating device 11 of the charger 10 (refer to FIG. 2) transmits a signal indicating the set offset time tob1, to the charger 30. At this time, the communicating device also transmits, for example, a signal indicating a difference "tos0–toa0" (corresponding to "tos–toa" according to the first example) between a transmission period tpc0 of the wireless communication system 1 (corresponding to "tpc" according to the first example) and the offset time, to the charger 30.

The charger 30 sets an offset time toa1 associated with the charger 10 and an offset time tos1 associated with the vehicle 40. Then, the charger 30 transmits a signal indicating the set offset time tos1, to the vehicle 40.

Then, at a time point (refer to a time point t1 in FIG. 7) at which only for the offset time toa0 passes from a time point at which a beacon is sent from the beacon 15 of the charger 10 (refer to a time point t0 in FIG. 7), the communicating device 11 of the charger 10 transmits a control signal to the vehicle 20. The charger 30 sends a beacon at a time point (refer to a time point t2 in FIG. 7) at which only for the offset time tob1 passes from the time point at which the beacon is sent from the charger 10.

The charger 30 transmits a control signal to the vehicle 40 at a time point (refer to a time point t3 in FIG. 7) at which only for the offset time toa1 passes from the time point at which the beacon is sent from the charger 30.

The communicating device 21 of the vehicle 20 (refer to FIG. 2) transmits a control signal to the charger 10 at a time point (refer to a time point t4 in FIG. 7) at which only for the offset time tos0 passes from the time point at which the beacon is sent from the charger 10. The vehicle 40 transmits a control signal to the charger 30 at a time point (refer to a time point t5 in FIG. 7) at which only for the offset time tos1 passes from the time point at which the beacon is sent from the charger 30.

The communicating device 11 of the charger 10 transmits a control signal to the vehicle 10 at a time point (refer to a time point t6 in FIG. 7) at which only for the transmission period tpc0 passes from the time point 1. The charger 30 transmits a control signal to the vehicle 40 at a time point (refer to a time point t7 in FIG. 7) at which only for a transmission period tpc1 passes from the time point t3.

The communicating device 21 of the vehicle 20 transmits a control signal to the charger 10 at a time point (refer to a time point t8 in FIG. 7) at which only for the transmission period tpc0 passes from the time point t4. The vehicle 40 transmits a control signal to the charger 30 at a time point (refer to a time point t9 in FIG. 7) at which only for the transmission period tpc1 passes from the time point t5.

Then, the beacon 15 of the charger 10 sends a beacon at a time point (refer to a time point t10 in FIG. 7) at which only for a sending period tpb0 passes from the time point t0. On the other hand, the charger 30 sends a beacon at a time point (refer to a time point t11 in FIG. 7) at which only for a sending period tpb1 passes from the time point t2.

The charger 30 may set an offset time associated with each of the charger 30 and the vehicle 40, on the basis of the beacon sent from the charger 10 (i.e. the beacon of the wireless communication system 1). In this case, the charger 30 may not send the beacon.

Each of the offset times toa0 and toa1 is desirably set in the same manner as the offset time toa in the first example described above. Each of the offset times tos0 and tos1 is desirably set in the same manner as the offset time tos in the first example described above.

The offset time tob1 associated with the beacon desirably satisfies a relational expression of 2×(DIFS)+CWmax+(Frame Occupancy Time)<tob1<Tpc. In FIG. 7, "Tpc"="tpc0"="tpc1". If there are three or more wireless communication systems and respective communication ranges overlap each other, the offset time associated with the beacon desirably satisfies a relational expression of 2×(DIFS)+CWmax+(Frame Occupancy Time)<tobn<Tpc ("tobn" means the offset time of an n-th beacon).

The "beacon sent from the charger 30" and the "offset time tob" according to the second example are respectively one example of the "second reference signal" and the "third offset time" according to the present invention.

In FIG. 7, the transmission period tpc0 and the transmission period tpc1 have the same value, and the sending period tpb0 and the sending period tpb1 have the same value. However, the transmission period tpc0 and the transmission period tpc1 may be different from each other, and the sending period tpb0 and the sending period tpb1 may be different from each other.

Modified Example

A wireless communication system according to a modified example of the second example will be explained with reference to FIG. 8.

Figure 8:
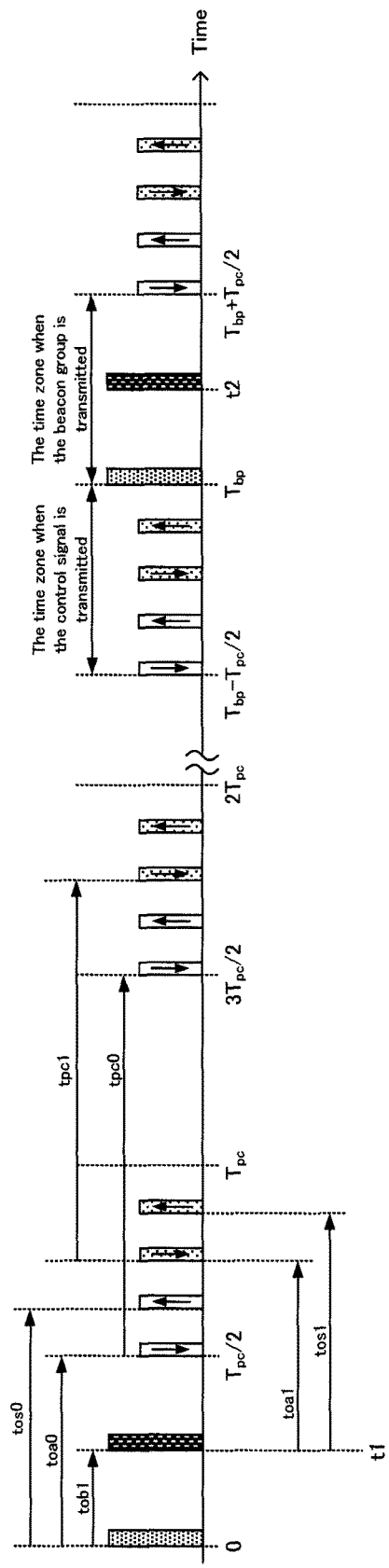
FIG. 8 is a conceptual diagram illustrating transmission timing of signals according to a modified example of the second example.

As illustrated in FIG. 8, in the wireless communication system according to the modified example, a time zone in which a beacon group is transmitted and a time zone in which the control signal is transmitted alternately appear. Here, a length of the time zone in which the beacon group is transmitted and a length of the time zone in which the control signal is transmitted are both "Tpc/2". In FIG. 8, "Tpc/2"="tpc0/2"="tpc1/2".

By virtue of such a configuration, even if respective communicable ranges of a plurality of wireless communication systems overlap each other, the offset time can be set, relatively easily. In particular, adjustment between the offset time associated with the beacon ("tob1" herein) and the offset time associated with the control signal ("toa0", "toa1", "tos0", and "tos1") is no longer required, which is extremely useful in practice.

In the modified example, the offset time tobn associated with the beacon is set in a range of 2×(DIFS)+CWmax+(Frame Occupancy Time)<tobn<Tpc/2 (wherein n=1). Moreover, the offset time associated with the control signal is set in a range of Tpc/2<toan<Tpc and in a range of Tpc/2<tosn<Tpc (wherein n=0, 1).

In FIG. 8, a time point 0 to a time point Tbp correspond to a sending period tbp0 of the beacon of the charger 10, and a time point t1 to a time point t2 correspond to a sending period tbp1 of the beacon of the charger 30. In FIG. 8, the respective sending periods of the beacons of the charger 10 and the charger 30 are both Tbp (i.e. "tbp0=tbp1=Tbp").

In the examples described above, the operation in the case of "no MAC ACK" is exemplified; however, obviously, the present invention is not limited only to the case of "no MAC ACK" but also can be applied even in the case of "MAC ACK". In the case of "MAC ACK", in addition to the signals illustrated in FIG. 4, FIG. 7, and FIG. 8, an "ACK signal" is transmitted to the charger 10 or 30 corresponding to the vehicle 20 or 40, before the transmission of the control signal from the vehicle 20 or 40.

The present invention is not limited to the aforementioned embodiments and examples, but various changes may be made, if desired, without departing from the essence or spirit of the invention which can be read from the claims and the entire specification. A wireless communication system, a wireless communication method, and a wireless communication apparatus that involve such changes are also intended to be within the technical scope of the present invention.

DESCRIPTION OF REFERENCE NUMERALS AND LETTERS 1, 2 wireless communication system
10, 30 charger
20, 40 vehicle
11, 21 communicating device
12, 22 CPU
13, 23 RAM
14, 24 ROM
15 beacon

The invention claimed is:

1. A wireless communication system comprising:
a first apparatus and a second apparatus that perform wireless communication with each other,
wherein the first apparatus sends a first reference signal, and starts signal transmission to the second apparatus with a first period from a time point at which a first offset time passes from sending the first reference signal,
the second apparatus starts signal transmission to the first apparatus with the first period from a time point at which a second offset time, which is different from the first offset time, passes from sending the first reference signal, and
the first apparatus transmits a signal indicating a time obtained by adding the first offset time and a fixed time, which is shorter than one period of the first period, as the second offset time to the second apparatus before starting the signal transmission.

2. The wireless communication system according to claim 1, wherein the first apparatus sends the first reference signal with a second period, which is longer than the first period.

3. The wireless communication system according to claim 2, wherein the first apparatus transmits a signal indicating a time obtained by adding the first offset time and a fixed time, which is shorter than one period of the first period, as the second offset time to the second apparatus before starting the signal transmission.

4. The wireless communication system according to claim 3, wherein said wireless communication system uses a carrier sense multiple access/collision avoidance (CSMA/CA) method in accordance with IEEE 802.11 standard.

5. The wireless communication system according to claim 4, wherein the first offset time is greater than a value that is obtained by adding a doubled value of Distributed Inter Frame Space (DIFS), a maximum value of a contention window, and an occupancy time associated with the signal transmission.

6. The wireless communication system according to claim 4, wherein the first offset time is greater than a value that is obtained by adding a doubled value of Distributed Inter Frame Space (DIFS), a maximum value of a contention window, an occupancy time associated with the transmission of the first signal, a Short Inter Frame Space (SIFS), and an occupancy time associated with an ACK frame.

7. The wireless communication system according to claim 2, wherein said wireless communication system uses a carrier sense multiple access/collision avoidance (CSMA/CA) in accordance with IEEE 802.11 standard.

8. The wireless communication system according to claim 7, wherein the first offset time is greater than a value that is obtained by adding a doubled value of Distributed Inter Frame Space (DIFS), a maximum value of a contention window, and an occupancy time associated with the signal transmission.

9. The wireless communication system according to claim 7, wherein the first offset time is greater than a value that is obtained by adding a doubled value of Distributed Inter Frame Space (DIFS), a maximum value of a contention window, an occupancy time associated with the transmission of the first signal, a Short Inter Frame Space (SIFS), and an occupancy time associated with an ACK frame.

10. The wireless communication system according to claim 1, wherein said wireless communication system uses a carrier sense multiple access/collision avoidance (CSMA/CA) method in accordance with IEEE 802.11 standard.

11. The wireless communication system according to claim 10, wherein the first offset time is greater than a value that is obtained by adding a doubled value of Distributed Inter Frame Space (DIFS), a maximum value of a contention window, and an occupancy time associated with the signal transmission.

12. The wireless communication system according to claim 10, wherein the first offset time is greater than a value that is obtained by adding a doubled value of Distributed Inter Frame Space (DIFS), a maximum value of a contention window, an occupancy time associated with the transmission of the first signal, a Short Inter Frame Space (SIFS), and an occupancy time associated with an ACK frame.

13. The wireless communication system according to claim 1, wherein the first apparatus transmits a signal indicating a third offset time, to another wireless communication system, which is different from said wireless communication system, so that a second reference signal associated with the another wireless communication system is sent at a time point at which only for the third offset time passes from sending the first reference signal.

14. An apparatus, which is one of two apparatuses in a wireless communication system, said apparatus comprising:
a communicating device configured to perform signal transmission to other apparatus out of the two apparatuses with a first period;
a beacon configured to send a reference signal; and
a Central Processing Unit (CPU) configured to determine offset times respectively associated with the two apparatuses,
wherein the communicating device transmits a signal indicating an offset time of the other apparatus, and starts the signal transmission to the other apparatus with the first period from a time point at which an offset time of said apparatus passes from sending the reference signal, and
the communicating device transmits a signal indicating a time obtained by adding the offset time of the apparatus and a fixed time, which is shorter than one period of the first period, as the offset time of the other apparatus to the other apparatus before starting the signal transmission.

* * * * *